United States Patent [19]

Parquet

[11] 3,951,281

[45] Apr. 20, 1976

[54] APPARATUS WITH PIVOTAL LATCHING MEANS FOR RETAINING AN OUTRIGGER IN AN INOPERATIVE POSITION

[75] Inventor: Donald J. Parquet, Burlington, Iowa

[73] Assignee: J. I. Case Company, Racine, Wis.

[22] Filed: Nov. 18, 1974

[21] Appl. No.: 524,536

[52] U.S. Cl. ................................ 214/140; 212/145; 280/150.5; 214/138 C

[51] Int. Cl.²...................... B66F 9/00; B66C 23/62; B60S 9/00

[58] Field of Search ............... 214/130 R, 141, 140; 212/28, 55, 145; 280/150.5; 254/86 R; 248/145, 202, 354 R, 439

[56] References Cited

UNITED STATES PATENTS

| | | | |
|---|---|---|---|
| 1,193,052 | 8/1916 | Pirsch | 280/150.5 X |
| 2,976,055 | 3/1961 | Harrison | 280/150.5 |
| 3,146,002 | 8/1964 | Faber | 280/150.5 |
| 3,365,214 | 1/1968 | Garnett | 212/145 X |
| 3,442,531 | 5/1969 | Rutledge | 280/150.5 |

FOREIGN PATENTS OR APPLICATIONS

| | | | |
|---|---|---|---|
| 236,739 | 6/1969 | U.S.S.R. | 212/145 |

*Primary Examiner*—Albert J. Makay
*Assistant Examiner*—R. B. Johnson
*Attorney, Agent, or Firm*—Dressler, Goldsmith, Clement & Gordon, Ltd.

[57] ABSTRACT

In heavy mobil construction machinery such as backhoes, power shovels and boom cranes, wherein outriggers are extended for lateral stabilization, an automatically self-locking and self-releasing mechanism is provided to restrain an outrigger in its retracted inoperative position when not in use. The mechanism is operable in response to simple hydraulic actuation of the outrigger, and does not require manual operation or remote controls to effect locking or release of the mechanism.

6 Claims, 3 Drawing Figures

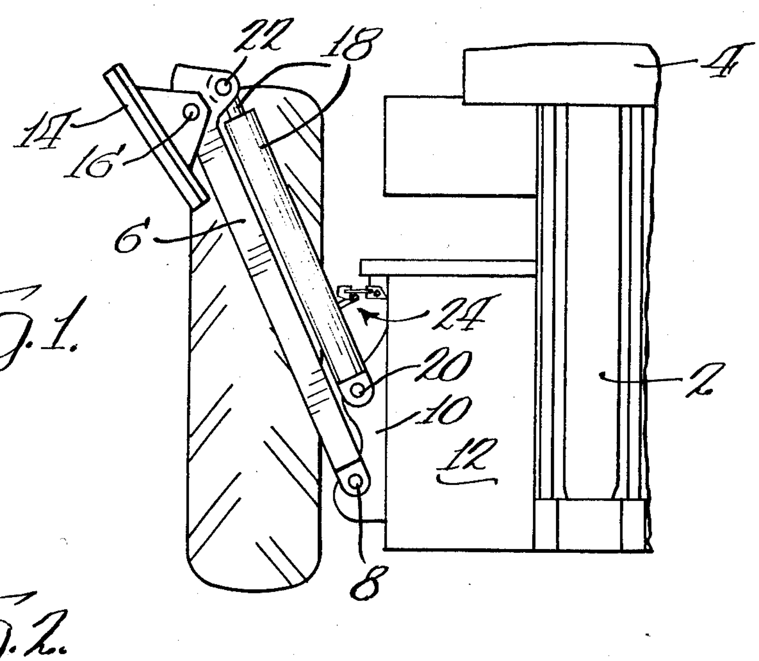
Fig. 1.
Fig. 2.
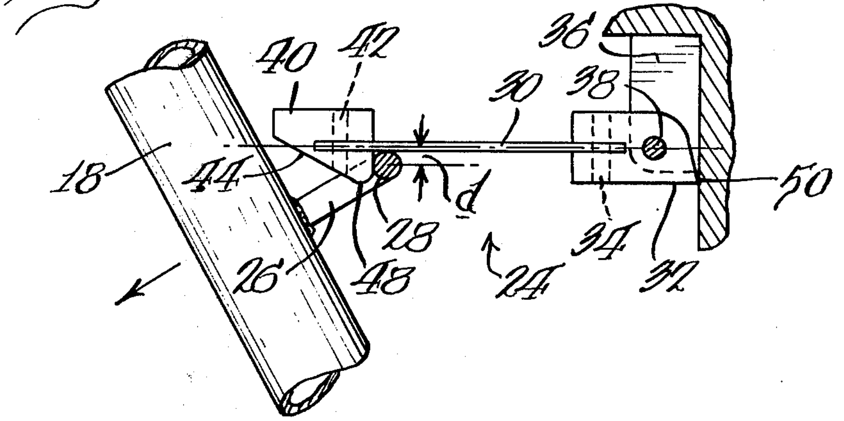
Fig. 3.
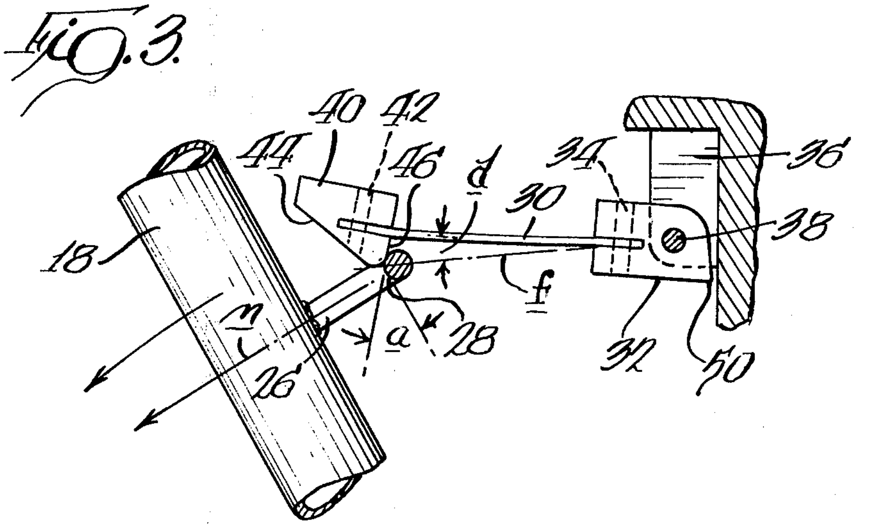

APPARATUS WITH PIVOTAL LATCHING MEANS FOR RETAINING AN OUTRIGGER IN AN INOPERATIVE POSITION

BACKGROUND OF THE INVENTION

Most construction vehicles such as backhoes, power shovels and boom cranes have outriggers which are extended downwardly from their side frames to engage the ground and provide lateral stabilization against tipping of the vehicle. These outriggers typically are hydraulically powered to anchor them against the ground when the machine is in operation, and to retract them upwardly to an inactive position when the machine is in transit or not in operation. If the hydraulic system itself is relied upon to maintain the outriggers firmly in their inactive positions, the outriggers have a tendency to droop downwardly due to various factors, such as cooling of the system after operation, and hydraulic system leakage. Any substantial "drooping" of an outrigger is undesirable, particularly when a vehicle is being transported along the highways.

Manually operated mechanical latches of the type shown in Garnett U.S. Pat. No. 3,365,214, for example, have been provided for the purpose of locking an outrigger in its retracted position. The principal disadvantage of such latches, linkages and the like is that the machine operator must dismount from his seat in order to release or lock the outrigger arm. A further disadvantage is that of foulability due to accumulations of dirt, particularly when mud has accumulated under freezing temperature conditions.

It is the principal object of this invention to provide an improved means for restraining an outrigger of the type described in its retracted inactive position.

SUMMARY OF THE INVENTION

In accordance with this invention there is provided a self-locking and self-releasing latching mechanism for securing an outrigger arm against the side of the frame of a heavy piece of mobile machinery when the outrigger is in its raised and inactive position. The latching mechanism preferably comprises a frame-mounted leaf spring having a nose portion providing a backwardly facing abutment surface. A finger on the outrigger arm latches behind this nose portion when the arm is in the raised position, but releases automatically due to bending of the spring when power is applied to lower the outrigger arm. A cam surface on the nose portion effects re-engagement of the latching mechanism when power is applied to raise the outrigger arm.

BRIEF DESCRIPTION OF DRAWINGS

In the accompanying drawings:

FIG. 1 is a view of the rearward left-hand end of a backhoe incorporating an outrigger latching mechanism in accordance with this invention;

FIG. 2 is a side elevation of the latching mechanism in accordance with this invention, with the outrigger arm being in its locked position; and FIG. 3 is a side elevation of the same latching mechanism under the condition wherein the outrigger arm is about to be released automatically.

DESCRIPTION OF THE PREFERRED EMBODIMENT

Referring to FIG. 1, a preferred embodiment of the invention will be described in its application to the well-known type of equipment which comprises a self-propelled tractor which carries a hydraulically operated bucket loader (not shown) at its front end and a hydraulically operated backhoe at its rearward end. The conventional backhoe comprises an articulated boom 2 carrying a toothed bucket 4. By means of hydraulic cylinders the bucket is caused to perform digging movements pivotally, vertically, in an arcuate path, and swinging from side to side. In the course of off-center lateral movements in particular, the machinery requires stabilization against being tipped over by the load on the extended boom 2, and such lateral stabilization is provided by an extensible outrigger arm 6 at each side of the tractor frame.

Each outrigger arm 6 comprises a tubular steel weldment which is hingedly connected by means of shaft 8 to a bracket comprising weldments 10 attached to machine frame 12. A corrugated or toothed steel pad 14 is pivotally connected to the distal end of each arm 6 by a shaft 16, and is adapted to engage the ground for static anchoring of the outrigger. The outrigger arm 6 can be raised and lowered by remote control of a hydraulic piston and cylinder unit 18 which is pivotally connected between bracket 10 and the outer end of arm 6 by pins 20 and 22, respectively, and may be considered part of arm 6.

The improvement in the form of a latching mechanism which is the subject of this invention is generally indicated at 24 in FIG. 1 and is actuated in response to movement of the outrigger arm. An "L" or "U" shaped bracket 26 is welded to the upper side of the arm 6, more specifically cylinder unit 18, and provides a right-angular finger or hook portion 28. A flat leaf spring 30 has an inner mounting block 32 secured thereto by a pin 34, the block 32 in turn being pivotally mounted in a bracket 36 on the machine frame 12 by means of a shaft 38. The outward end of leaf spring 30 is provided with a member 40 by means of a pin 42, the member 40 constituting a nose portion having an inclined downwardly facing cam surface 44 and an inwardly facing abutment surface 46, the surfaces 44 and 46 being smoothly merged at 48. A stop 50 on the inner block 30 acts to obstruct downward (counter-clockwise) rotation beyond the position shown in FIG. 2, but permits lifting of the leaf spring 30 and pivotal movement of block 32 in a clockwise direction.

In operation, under hydraulic power the cylinder unit 18 moves the outrigger arm 6 to bring the portion 28 of bracket 26 into engagement with cam surface 44, thereby lifting the nose portion 40 until the finger moves behind abutment surface 46, whereupon the leaf spring 30 falls back to the position shown in FIG. 2. It is significant to note that the finger portion 28 of bracket 26 is offset from the longitudinal axis of the leaf spring by a distance *d*. Therefore, upon exertion of an outward pulling force between these members along a line of force *f*, a moment will occur which must bend the leaf spring as shown in FIG. 3. As the angle *a* between the abutment surface 46 and the direction of movement *m* increases, abutment surface 46 will begin to slide, increasing the distance *d*, and thereby increasing the spring bending moment, causing the block 32 to pivot on shaft 38, and eventually the outrigger will be self-released at the point shown in FIG. 3. It is apparent that the leaf spring stress with this arrangement is much less than if block 32 was immovable.

From the foregoing description it will be evident that in operation the machine operator need not dismount from his seat in order to lock or release the latching mechanism 24, but needs only to operate the hydraulic cylinder 18 and the force of the outrigger's movement will be sufficient to latch or unlatch the outrigger arm with respect to the machine frame. A remotely controlled latching system employing electrical or hydraulic controls could be provided but, of course, such a system would entail additional cost and servicing complexities.

It should be understood that the invention is not strictly limited in its application to a backhoe type of machine requiring lateral stabilization, but is similarly applicable to other types of mobile equipment wherein similar problems are encountered as, for example, in boom cranes, power shovels, and the like.

It will be further understood that various departures from the specifically disclosed embodiment of the invention may be effected without departing from the scope thereof, as defined by the claims. For example, it is apparent to those skilled in the art that leaf spring 30 could be fixed to bracket 36. However, in such instances the leaf spring would have to be stressed much more to accommodate movement of member 40.

What is claimed is:

1. In a mobile heavy duty machine having a load lifting boom and at least one outrigger arm pivotally mounted on a frame and movable between a ground-engaging position and a substantially vertical raised and inactive position, said outrigger being adapted to provide lateral stabilization for the machinery, power means for pivoting said outrigger arm, the improvement of a latching mechanism actuated in response movement of said arm to secure said outrigger against the frame when the arm is in said substantially vertical raised and inactive position, said latching mechanism comprising a leaf spring member and a finger member, said finger member being movable with and extending inwardly from said arm toward said frame when in said substantially vertical position, a mounting block pivotally supporting said leaf spring member on said frame, said mounting block having a stop defining a first cantilevered position for said leaf spring member extending outwardly from said frame to engage said one member, said leaf spring member having an outer nose portion forming a backwardly facing offset abutment surface extending substantially normal to the axial length of the leaf spring member, and said finger member having a portion engageable with said abutment surface, said spring being sufficiently flexible to bend under the moment of a pulling force exerted on said members, pivoting said leaf spring member from said first position thereby causing said nose portion to slide from behind said finger member and releasing the outrigger arm from retention by the frame.

2. In a machine according to claim 1, wherein the outer end of said nose portion has a cam surface engageable with said finger member, whereby the leaf spring member is displaceable to permit re-engagement of said abutment surface and finger portion upon movement of said members toward each other.

3. In a machine according to claim 1, wherein said leaf spring is mounted on and extends horizontally outwardly from said frame and said nose portion thereof extends downwardly into engagement with said finger portion.

4. In a machine according to claim 3, wherein the outer end of said nose portion carries an inclined cam surface engageable with said finger portion to displace said leaf spring member upwardly and thereby permit re-engagement of said abutment surface and finger portion upon movement of said members toward each other.

5. In a machine according to claim 4, wherein the shape of said finger member provides a hook engageable with said abutment surface.

6. In a piece of mobile heavy duty machinery having a load lifting boom and at least one outrigger arm pivotally mounted on a frame and movable between a ground-engaging position and a substantially vertical raised and inactive position, said outrigger being adapted to provide lateral stabilization for the machinery, and power means for pivoting said arm, the improvement of a latching mechanism for securing said outrigger against the frame when the arm is in said substantially vertical raised and inactive position, said latching mechanism comprising a leaf spring, a mounting block pivotally supported on said frame and supporting said leaf spring, said mounting block having a first position where said leaf spring extends laterally outwardly from the frame, said leaf spring having an outer nose portion forming an inwardly facing offset abutment surface extending substantially normal to the axial length of the leaf spring member and an outwardly facing cam surface inclined with respect to said length, and a finger member mounted on and extending inwardly from said power means, said finger member having a portion engageable with said inwardly facing abutment surface when the outrigger is in said vertical position, said leaf spring being flexible to bend under the moment of a pulling force exerted through said members, thereby causing said nose portion to slide from behind said finger member and pivoting said block on said frame to release the outrigger arm from retention by the frame, and said inclined cam surface being engageable with said finger member whereby the leaf spring is displaceable to permit re-engagement of said members upon movement toward each other.

* * * * *